Oct. 1, 1929.                J. S. LAING                1,730,278
                            SAFETY DEVICE
                         Filed June 13, 1929            2 Sheets-Sheet 1

WITNESSES
Carrie Bailey
Dorothy L. King

Inventor
James S. Laing,
By O. P. Wochaupter,
Attorney

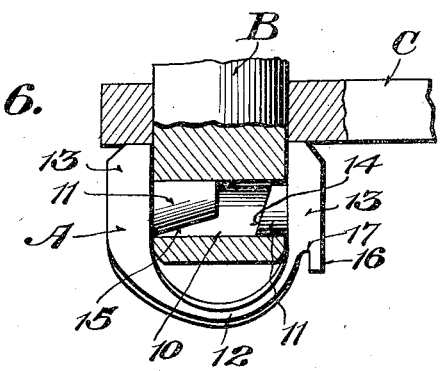
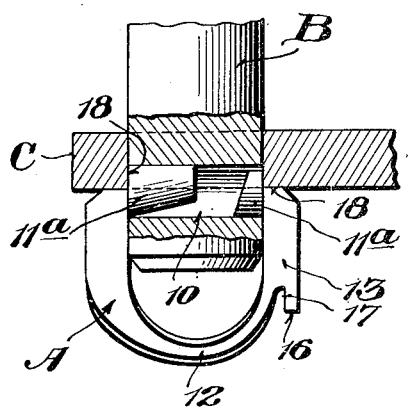
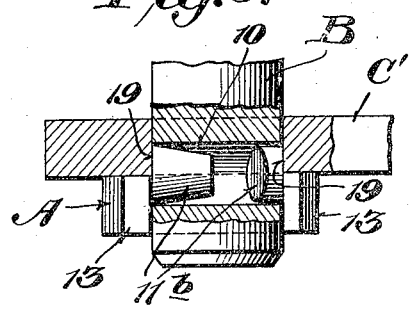
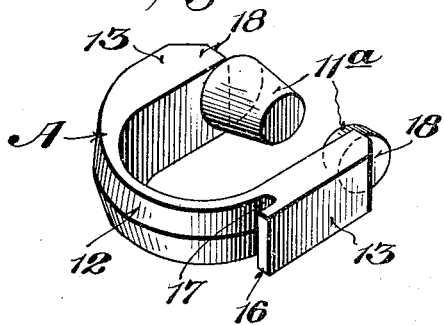
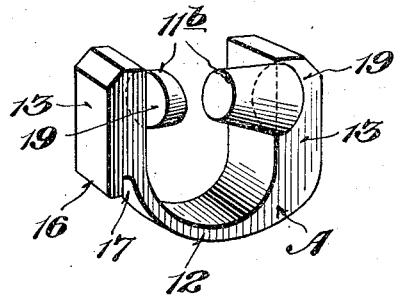

Patented Oct. 1, 1929

1,730,278

UNITED STATES PATENT OFFICE

JAMES S. LAING, OF NEW YORK, N. Y.

SAFETY DEVICE

Application filed June 13, 1929. Serial No. 370,691.

This invention relates to stop means for detachable connection with an element such as a pin, rod, bar or the like to limit relative sliding movement between such element and another element which is slidable on said first mentioned element, or in which said first mentioned element is slidable, the invention being capable of general use but being particularly adapted as a brake pin lock.

The general object of the invention is to provide a key or stop device which possesses maximum strength combined with minimum weight and bulk, which is relatively cheap and easy to produce, which is capable of exceptionally quick and easy attachment to and detachment from a pin, rod, bar or the like, and which is thoroughly reliable and efficient in use.

With the foregoing and other purposes in view, the invention consists in the novel features of construction, combination and arrangement of parts as will be hereinafter more fully described, illustrated in the accompanying drawings and defined in the appended claims.

In the drawings, wherein like characters of reference denote corresponding parts in the different views:—

Fig. 3 is a view similar to Fig. 2 illustrating the manner of engaging the device with or disengaging it from a pin, rod, bar or the like.

Fig. 4 is a side elevation of the device engaged with a pin, rod, bar or the like.

Fig. 6 is a view illustrating the application of the lock device longitudinally of the pin instead of circumferentially.

Fig. 7 is a view illustrating a modified form of lock device, the locking lugs being offset longitudinally from the ends of the device to cooperate with the part to be locked.

Fig. 8 is a perspective view of the locking device shown in Fig. 7.

Fig. 9 is a view illustrating the modification of the invention, wherein the lugs are offset transversely from the ends of the locking device so that when the latter is applied circumferentially of a pin or the like it may cooperate with one of the parts to be locked.

Fig. 10 is a perspective view of the locking device shown in Fig. 9.

Figure 1:
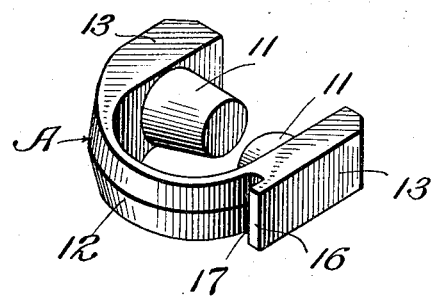
Fig. 1 is a perspective view of the improved stop device.

Referring to the drawings in detail, A designates, generally, the present stop device and B a brake pin or other form of pin, rod, bar or the like with which said stop device is adapted for detachable connection, said pin B, in accordance with the invention, being provided either with a transverse opening 10 extending therethrough, as herein shown, or at least with alined recesses formed in opposite sides thereof.

The stop device A consists essentially of a pair of lugs 11, 11 connected together by a resilient yoke 12, said lugs being disposed in axial alinement and extending inwardly towards one another from preferably enlarged end portions 13, 13 of the yoke 12. These end portions 13 may be formed either integrally with said yoke or separate therefrom and secured thereto in any suitable manner, and the lugs 11 likewise may be formed either integrally with or separate from and rigidly secured to the end portions of the yoke.

The inner end of one of the lugs 11 is beveled from the side of the lug nearest the yoke 12 outwardly towards the opposite side of the lug, as indicated at 14, while the other of said lugs is tapered inwardly as indicated at 15, the side of said tapered lug remote from the yoke 12 preferably being disposed parallel to the common axis of the lugs, and the taper being formed preferably by beveling the side of the lug adjacent to the yoke towards the inner end and the opposite side of the lug.

The end portion 13 of the yoke 12 which carries the lug 11 having the beveled end 14 is provided with a lip 16 extending in the general direction of the yoke and disposed in spaced relation to the outer face of the latter to provide a recess 17 for the accommodation of a tool such as a screw driver to effect disengagement of the device from a pin B with which the device is engaged.

Figure 3:
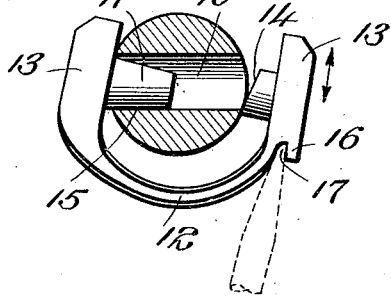
Figure 4:
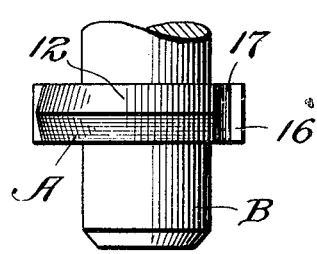
Figure 5:
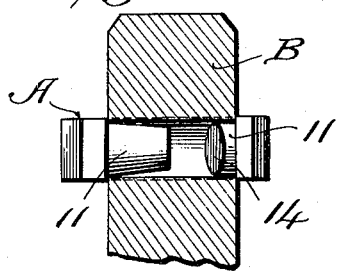
Fig. 5 is a section on the line 5—5 of Fig. 2.

To attach the device to a pin B all that is necessary is to engage the tapered lug 11 in one end of the hole 10 and apply pressure to the device in a direction to cause the other lug 11 to ride over the side of the pin B into alinement with the other end of the hole 10, the resilient yoke 12 yielding to permit this action and to cause the last mentioned lug to snap into the hole 10 as is understood. By beveling one of the lugs 11 as at 15 in the manner previously explained engagement of such lug within one end of the hole 10 is facilitated as is apparent from the illustration in Fig. 3 of the drawings, while by beveling the inner end of the other of said lugs as at 14, wedging action of said lug against the pin B to spread the yoke during engagement of the device with said pin also is facilitated.

Figure 2:
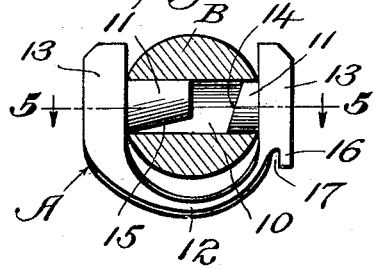
Fig. 2 is a transverse section through a pin, rod, bar or the like showing the lock device operatively engaged therewith.

When the device is engaged with a pin B as illustrated in Fig. 2, all that is necessary to effect its disengagement from said pin is to engage a tool such as a screw driver in the recess 17 and, using the side of the yoke 12 adjacent to said recess as a fulcrum, exert a prying force against the lip 16. This will cause the bevel ended lug 11 to be withdrawn from the hole 10, whereupon the device may readily be removed from the pin.

As is apparent, the cross section of the lugs 11 may be varied for light or heavy duty without varying the cross section of the yoke 12, since the function of the latter is merely to hold the lugs engaged in the ends of the hole 10, the lugs and the ends of the yoke taking all stress imposed on the device. The stress to which the device is subjected is, of course, longitudinal of the pin B, and since the lugs 11 may, by reason of their construction and arrangement as previously set forth, be formed to snugly fit the hole 10 at their bases at least, where practically all stress to which the device is subjected is transmitted thereto, the reason why the yoke 12 may be formed relatively light and of substantially the same cross section for lugs 11 of increased cross section within a relatively wide range is apparent.

In accordance with the illustration of the invention in Figs. 1 to 5 of the drawings, the locking device may be applied circumferentially of the pin, that is, it may be applied in a manner to substantially embrace the pin. However, as shown in Fig. 6, the device A may be applied longitudinally from the pin and from the end thereof.

Figs. 7 and 8 illustrate further modifications of the invention, wherein the lugs 11$^a$ and 11$^b$ are offset from the body of the device A to cooperate with one of the parts to be locked, for example, a brake lever C so that all possibility of the locking device coming loose is prevented.

In the embodiment shown in Fig. 7, the lugs 11$^a$ are offset longitudinally from the ends of the body of the device thereby providing shoulders 18 projecting beyond the extremities of the body A which may be engaged by the brake lever or its equivalent to prevent withdrawal of the lugs until the lever is lifted.

Fig. 8 of the drawings illustrates the locking lugs 11$^b$ transversely offset from the body of the device A, so that the brake lever C' may cooperate with the shoulders 19 to prevent accidental withdrawal of the lugs from the keeper opening in the pin.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A stop device for detachable connection with a transversely apertured pin, comprising a yoke, and inwardly extending alined lugs carried by end portions of said yoke for engagement in the aperture in said pin, one of said lugs having its inner end beveled from the side of the lug adjacent to the yoke outwardly towards the other side thereof.

2. A stop device for detachable connection with a transversely apertured pin, comprising a yoke, and inwardly extending alined lugs carried by end portions of said yoke for engagement in the aperture in said pin, one of said lugs being tapered towards its free end, the side of said tapered lug remote from the yoke being parallel to the common axis of the lugs and the taper thereof being formed by beveling the side adjacent to the yoke from the base of the lug towards the free end and the opposite side thereof.

3. A stop device for detachable connection with a transversely apertured pin, comprising a yoke, inwardly extending lugs carried by end portions of said yoke for engagement in the aperture in said pin, and a lip formed on said device for engagement by a tool to effect relative spreading movement of the free end portions of the device.

4. A stop device for detachable connection with a transversely apertured pin, comprising a substantially U-shaped resilient yoke, and inwardly extending alined lugs on the free end portions of said yoke, one of said lugs being tapered towards its free end and the inner end of the other lug being beveled from its side adjacent to the yoke outwardly towards the other side thereof.

5. A stop device for detachable connection with a transversely apertured pin, comprising a substantially U-shaped resilient yoke having enlarged free end portions, and alined lugs projecting inwardly from said free end portions.

6. A stop device for detachable connection with a transversely apertured pin, comprising a substantially U-shaped resilient yoke having enlarged free end portions, alined lugs projecting inwardly from said free end portions, and a lip formed on one of said enlarged free end portions overlying an intermediate portion of said yoke in spaced relation thereto.

7. A stop device of the class described, comprising a resilient yoke and inwardly extending lugs carried by the end portions of said yoke and offset from the body of the yoke.

8. A stop device of the class described, comprising a body including a resilient yoke portion and inwardly extending lugs, said lugs being offset beyond an edge of the body.

9. A locking device of the class described, comprising the combination with an apertured pin and a member to be locked on said pin of the body of the device comprising a resilient yoke portion and inwardly extending lugs, said lugs being offset from an edge of the body to provide a shoulder adapted to be engaged by said member to be locked on the pin.

10. A locking device for locking an apertured pin and a connecting part together comprising a body including a resilient yoke portion and inwardly extending lugs for entering the apertured pin, said lugs being offset from the body to present a shoulder for interlocking with the connecting part.

11. A stop device for detachable connection with a transversely apertured pin, comprising a yoke, and inwardly extending lugs of different length carried by end portions of said yoke for engagement in the aperture in said pin, and means on the end of the yoke having the shortest lug adapted for tool engagement to facilitate removal.

12. A stop device for detachable connection with a transversely apertured pin, comprising a yoke, and inwardly extending lugs carried by end portions of said yoke for engagement in the aperture in said pin, one of said lugs tapering throughout its length towards its free end.

13. A stop device for detachable connection with a pin recessed at opposite sides thereof, comprising a pair of lugs for engagement in said pin recesses, a resilient member connecting said lugs and means adapted for tool engagement to expand the resilient member.

14. A stop device for detachable connection with a transversely apertured pin, comprising a body including a spring yoke having enlarged end portions and inwardly extending lugs carried by said end portions for engagement in the aperture in said pin, one of said lugs having a beveled end face.

In testimony whereof I hereunto affix my signature.

JAMES S. LAING.